United States Patent [19]

Shannon et al.

[11] Patent Number: 4,978,169
[45] Date of Patent: Dec. 18, 1990

[54] SEAT HEADREST COMPOSITE SPRING CLIP

[75] Inventors: Michael V. Shannon, Allen Park; Peter Y. S. Wong, Ann Arbor, both of Mich.

[73] Assignee: Chrysler Corporation, Highland Park, Mich.

[21] Appl. No.: 452,033

[22] Filed: Dec. 18, 1989

[51] Int. Cl.$^5$ ............................................. A47C 7/36
[52] U.S. Cl. ..................................... 297/410; 297/391
[58] Field of Search ......................... 297/410, 391, 404

[56] References Cited

U.S. PATENT DOCUMENTS

| 3,498,672 | 3/1970 | Leichtl | 297/410 |
| 3,563,603 | 2/1971 | D'April et al. | 297/410 |
| 3,904,241 | 9/1975 | Makinen | 297/410 X |

FOREIGN PATENT DOCUMENTS

| 2024615 | 1/1980 | United Kingdom | 297/410 |
| 2165446 | 4/1986 | United Kingdom | 297/410 |

Primary Examiner—Laurie K. Cranmer
Attorney, Agent, or Firm—Edward P. Barthel

[57] ABSTRACT

An improved latch arrangement for attaching an aluminum support post of a headrest to a vehicle seat back. A mounting bracket supported on seat back frame having a passage slidably receiving the support post. The mounting bracket passage is arranged with a composite locking member comprising a sheet metal leaf spring having upper and lower plastic catches fixedly secured thereon. The plastic catches extend through associated windows in the bracket for biased sliding contact with an engagement of the support post to limit the adjusting movement of the headrest.

2 Claims, 2 Drawing Sheets

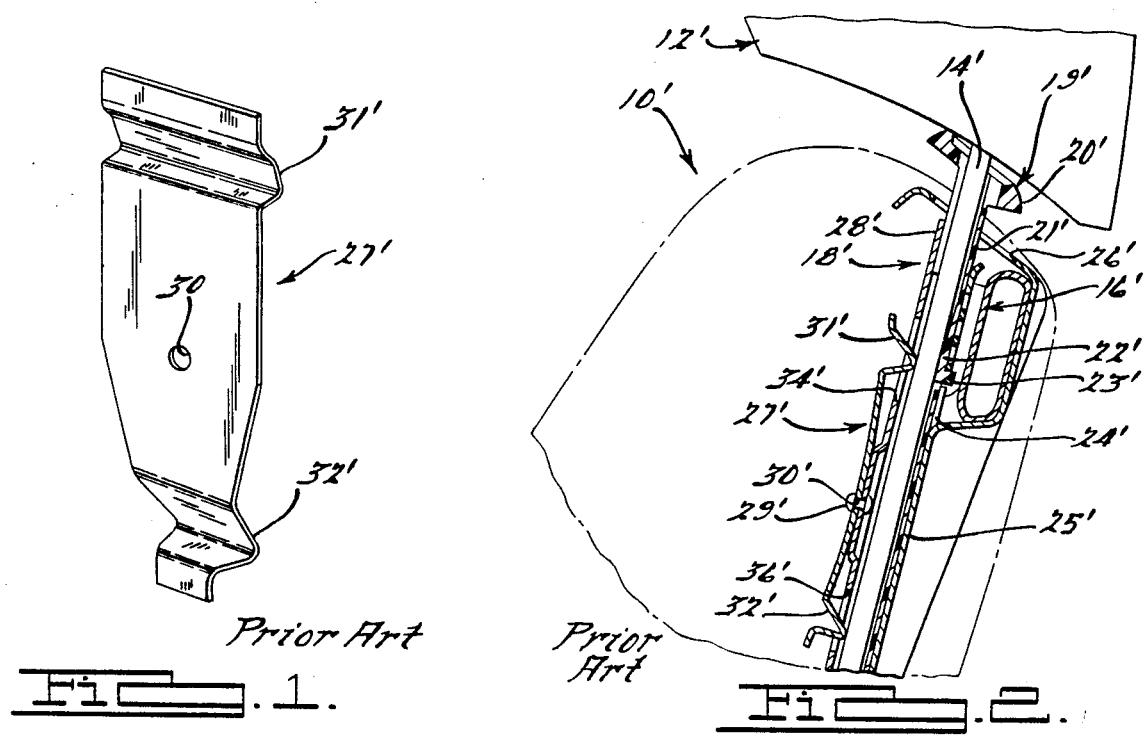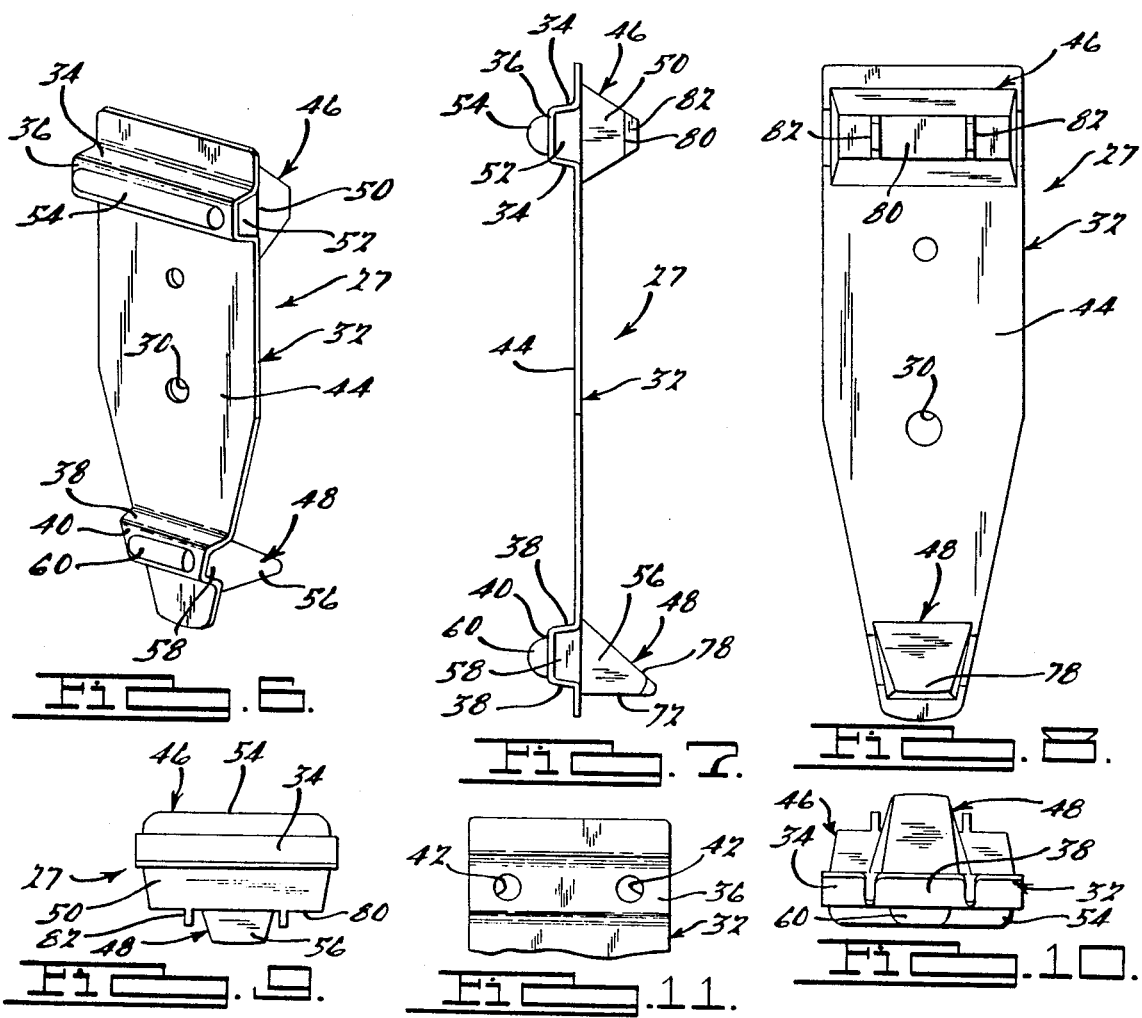

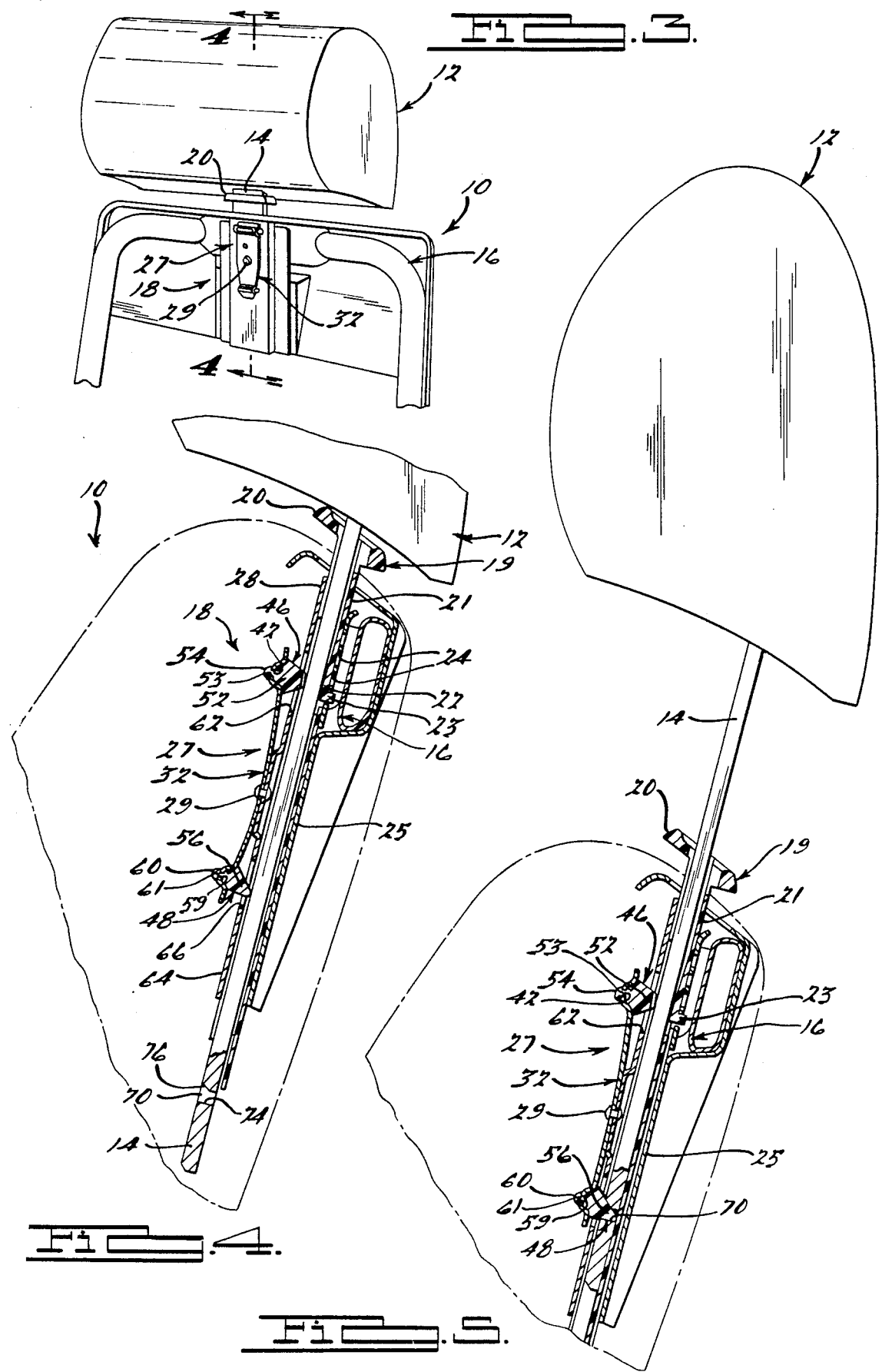

SEAT HEADREST COMPOSITE SPRING CLIP

BACKGROUND OF THE INVENTION

This invention relates to a headrest for a motor vehicle seat and more particularly to an improved composite latch clip for attaching the headrest and a escutcheon to the vehicle seat.

The U. S. Pat. No. 3,904,241 issued Sept. 9, 1975 to Makinen entitled Vehicle Headrest is representative of prior art arrangements to adjustably attach a support bar of a headrest and an escutcheon to a vehicle back seat. An example of another prior art vehicle seat headrests is shown in FIGS. 1 and 2 of the drawings wherein the existing conventional members are indicated by primed numbers. FIG. 1 shows the upper portion of a vehicle seat back assembly generally indicated at 10'. The headrest commonly includes a padded headrest assembly 12' having a rectangular sectioned aluminum support post 14' extending downwardly from the cushion into seat back frame 16' where it is engaged in a mounting bracket 18'. A plastic escutcheon 19' has a collar 20' integral with a sleeve portion 21' partially surrounding the support bar and formed with a resilient finger 22' and a locking abutment 23' for engagement in one of a series of openings 24' in mounting bracket rear wall 25' to vertically position the escutcheon collar 20' on the seatback trim (not shown). The escutcheon collar 20' conceals opening 26' in the seat back trim which receives the support bar 14'.

Prior art FIGS. 1 and 2 disclose a generally elongate sheet steel leaf spring locking member 27' secured adjacent to its longitudinal center to mounting bracket front wall 28' by a rivet 29' extending mounting through hole 30'. The leaf spring locking member 27' is formed with a transversely extending V-shaped channel adjacent its upper and lower ends defining respective upper 31' and lower 32' catches. As seen in prior art FIG. 2 the upper catch 31' is adapted to project into a vertically aligned upper window 34' in the bracket front wall 28' while the lower catch 32' is adapted to project into a vertically aligned lower window 36' in wall 28'. During adjustment of the positions of the headrest 12, the upper 30' and lower 32' catches are resiliently deflected outwardly while riding on the opposed cam surface of the post. The catches 31' and 32' move into and out of engagement with a locking recess in the post such as shown at 70 in FIG. 5 of the drawings.

The steel catches 31' and 32' are unsatisfactory in that they have a tendency to scratch or mark the softer aluminum support bar. Thus, after adjusting the headrest bar up and down a number of times, the steel catches eventually cut into or score the bar opposed flat cam surface causing a metal to metal scraping noise while increasing operator effort in raising and lowering the bar to adjust the headrest 12'.

SUMMARY OF THE INVENTION

It is an object of the present invention to provide an improved composite leaf spring latch arrangement for a vehicle seat headrest including a single longitudinally extending composite metal leaf spring. It is a further object of the present invention to provide an improved composite leaf spring latch arrangement secured to a bracket incorporating plastic latch members enabling smooth noise-free ready adjustment of the headrest to different heights.

It is still another object of the present invention to provide an improved composite leaf spring latch arrangement such that the sheet metal leaf spring is formed with a pair of upper and lower transversely extending U-shaped channels projecting forwardly therefrom, wherein each channel is defined by a pair of planar flank portions joined by a planar bight portion therebetween. Upper and lower plastic members are each molded with a wedge-shaped catch portion and a block-shaped tenon portion. Each of the block-shaped tenon portions is sized for complementary mold interlocking reception in its associated U-shaped channel such that its associated wedge-shaped portion extends rearwardly therefrom for biased contact with an opposed cam surface of the headrest metal post.

BRIEF DESCRIPTION OF THE DRAWINGS

These and other features and advantages of the present invention will appear from the following written description and accompanying drawings in which:

FIG. 1 is a perspective view of a prior art leaf spring member having catches formed therein;

FIG. 2 is a fragmentary vertical sectional view of a vehicle seat back showing a prior art arrangement for adjustably supporting a headrest post therein;

FIG. 3 is a fragmentary perspective view of a vehicle seatback showing the headrest mounting of the present invention;

FIG. 4 is an enlarged fragmentary vertical sectional view taken substantially on line 4—4 of FIG. 3 showing the headrest in its lowermost adjusted position;

FIG. 5 is a view similar to FIG. 4 showing the headrest in its uppermost adjusted position;

FIG. 6 is a perspective detail view of the composite spring latch shown in FIGS. 3, 4, and 5;

FIG. 7 a side elevational view of the composite spring latch arrangement of FIG. 6;

FIG. 8 is a front elevational view of the composite latch arrangement of FIG. 6;

FIG. 9 is an end elevational view looking at the upper end of the arrangement in FIG. 8;

FIG. 10 is an end elevational view looking at the lower end of the latch arrangement in FIG. 8; and FIG. 11 is a fragmentary detail plane view of the leaf spring upper end.

DESCRIPTION OF THE INVENTION

Referring to FIG. 3 there is shown the upper portion of a vehicle seat back 10 including a padded headrest assembly 12 mounted on the seat back by a rectangular cross sectioned aluminum support post 14. The support post extends downwardly from the headrest assembly 12 and is mounted on seatback frame 16 where it is engaged in a mounting bracket generally indicated at 18. A plastic escutcheon 19 includes an upper collar portion 20 integral with a C-sectioned sleeve portion 21 depending therefrom.

As seen in FIG. 4 the C-sectioned sleeve portion 21 surrounds the back and side edges of the support bar 14 and is formed with a resilient finger 22 and locking abutment 23 adapted for engagement in one of a series of openings 24 in mounting bracket rear wall 25 in the same manner as shown in the prior art FIG. 2.

A generally elongate composite locking member, generally indicated at 27, is secured adjacent its longitudinal center to mounting bracket front wall 28 by a rivet 29 extending through hole 30 (FIG. 6). With reference to FIGS. 6 and 7 the composite locking member 27 comprises a steel leaf spring 32 uniquely integrated with a pair of plastic catches described below. The leaf spring is formed with a pair of transversely oriented upper and lower U-shaped channels. The upper channel is defined by a pair of planar flank portions 34 joined by a planar bight portion 36 while the lower channel is defined by a pair of planar flank portions 38 joined by planar bight portion 40. As seen in FIG. 11 the upper channel bight portion 36 of the leaf spring 32 initially has a pair of laterally spaced injection molding holes drilled therein. The lower channel bight portion 40 of the leaf spring 32 has a single injection molding hole therein (not shown).

As seen in FIG. 7 each of the upper 36 and lower 40 bight portions lie in a common imaginary plane oriented parallel to the plane of leaf spring central plate portion 44. Further, it will be noted that the pair of upper flank portions 34-34 and the pair of lower flank portions 38-38 diverge outwardly away from their associated bight portions 36 and 40 respectively, at a slight acute angle.

FIGS. 6-8 show upper and lower plastic members 46 and 48 respectively, secured in associated upper and lower transversely extending U-shaped channels formed, as by stamping, in the leaf spring 32. The upper plastic member 46 is formed in an injection molding process mold cavity together with the metal leaf spring 32 providing a symmetrical wedge-shaped upper catch portion 50 and a block-shaped tenon portion 52 coextensive therewith. It will be noted in FIG. 7 that the tenon portion 52 is molded in its associated upper U-shaped channel. Further, the molding process causes the hot plastic to be forced through the bight portion holes 42 wherein the mold cavity forms a transversely extending raised retaining rib portion 54 interconnected to the tenon portion 52 via a pair circular sectioned plug or core portions 53 ((FIG. 4) molded in each of the pair of injection molding holes 42. Thus, the rib portion 54 and the tenon portion 52 are integrally interlocked by the core portion 53 thereby mechanically retaining the upper plastic member 46 in its associated U-shaped upper channel.

In a similar arrangement the lower plastic member 48 is formed with an asymmetrical wedge-shaped lower catch portion 56 having an integral block-shaped lower tenon portion 58 coextensive therewith. The lower tenon portion 58 is molded in its associated lower U-shaped channel. The lower tenon portion 58 is also integrally formed with a transversely extending raised retaining rib portion 60 by virtue of the hot plastic flowing through an associated injection molding hole 59 in bight portion 40. Thus, in the same manner as recited above the rib portion 60 and its block-shaped tenon portion 58 are integrally interlocked during the injection molding process by a single circular sectioned plastic plug or core portion 61 (FIG. 4) formed in the molding hole (not shown) of the bight portion 40.

As seen in FIG. 4 with the headrest 14 in its lowermost adjusted position, the leaf spring 32 is bowed or forwardly deflected in a concave-convex manner. Further, the upper catch portion 50 projects into an upper vertically aligned window 62 in the bracket front wall 64 for spring biased contact with an opposed forward facing cam surface of the support post 14. In a similar manner the lower catch portion 56 projects into a lower vertically aligned window 66 in the bracket front wall 64 for spring biased contact with the support post opposed forward facing planar cam surface.

Upon the headrest 14 being elevated to its upper extended position of FIG. 5 it will be noted that the upper plastic wedge-shaped catch portion 52 remains in spring biased contact with the opposed cam surface of the support post 14. The lower wedge-shaped catch portion 56 is spring biased into a locking rectangular shaped recess or 70 provided in the support post 14. The asymmetric shape of the lower wedge-shaped catch portion 56 provides a normal downwardly facing surface 72 for flush locking engagement with a mating internal horizontally disposed edge 74 of the locking aperture 70. It will be noted that the aperture 70 has its upper internal edge beveled at 76 conforming to upper sloped surface 78 of the lower catch portion 56 allowing smooth camming release thereof.

It will be seen in FIGS. 7 and 8 that the upper truncated wedge-shaped catch portion 50 defines a planar base 80 formed with a pair of transversely spaced longitudinally extending integral raised detent runners 82. The plastic runners 82 lower the coefficient of friction between the cam detent surface of the support post 14 and the plastic catch portion 50 thereby minimizing user effort required to adjust the headrest 12 while also reducing noise levels.

Although only one embodiment of the invention has been illustrated and described, it is apparent that modifications and variations will readily come to mind of a person skilled in the art which modifications and variations do not fall outside the scope of the invention as defined by the following claims.

What is claimed is:

1. In a vehicle seating including a seat back having an opening, a headrest assembly having a rectangular sectioned support bar extending downwardly therefrom, a mounting bracket support on the seat back having a rectangular sectioned vertically disposed passage defined by transversely extending side walls and longitudinally extending end walls, said passage slidably receiving said support bar, an escutcheon having an elongated C-shaped body surrounding the support bar and defining the opening in the seat back, said mounting bracket passage having a resilient leaf spring locking member secured to said bracket one side wall, said leaf spring locking member formed with upper and lower catch means, an -upper window in said bracket one side wall into which said upper catch means extends for spring biased engagement of said bar, a lower window in said bracket one side wall through which said lower latch means extends for spring biased engagement of said bar, and said support bar having at least one recess therein into which said lower catch means is received, an improved composite leaf spring latching member comprising:

a composite sheet metal leaf spring incorporating plastic catch members, said leaf spring having forward and aft planar surfaces, said leaf spring formed with upper and lower transversely extending U-shaped channels projecting forwardly therefrom, each of said upper and lower channel being of generally symmetrical configuration with each channel defined by a pair of planar flank portions joined by a planar bight portion therebetween;

each said upper and lower channel bight portion lying in a common plane oriented parallel to the plane of said leaf spring;

upper and lower plastic members molded from elastomeric resin material secured in said upper and lower channels, respectively, each said plastic member formed with a wedge-shaped catch portion and a block-shaped tenon portion, each said block-shaped tenon portion sized for complementary molded interlocked reception in its associated U-shaped channel such that its associated wedge-shaped portion extends rearwardly therefrom;

one or more retaining through holes located on the a forward surface of its associated bight portion, each said retaining through hole integrally joined with its associated plastic member tenon portion via one or more integral core portions formed in its associated bight portion retaining hole;

whereby with an intermediate portion of said leaf spring fixedly secured to said bracket front wall each said upper and lower plastic member wedge-shaped catch portion operative to be slidably received in an associated upper and lower window for spring biased engagement with said support bar forward face thereby limits the vertical adjusting movement of said headrest.

2. The improved spring latching member as set forth in claim 1, wherein said plastic member upper wedge-shaped catch portion having a truncated wedge shaped cross section defining a planar base parallel with its associated bight portion, said planar base formed with a plurality of longitudinally extending raised detent runners adapted for slidable engagement on said post opposed surface.

* * * * *